UNITED STATES PATENT OFFICE.

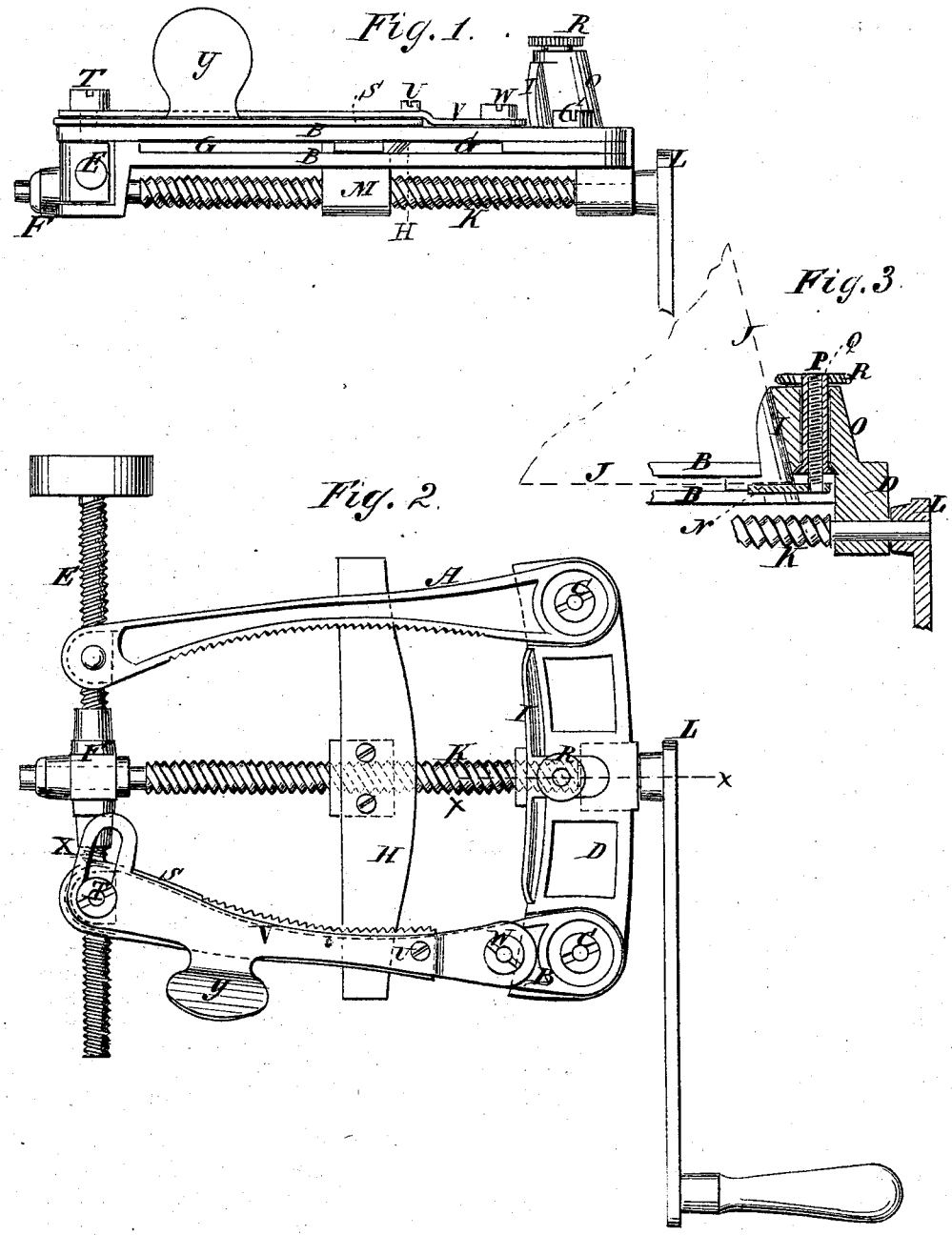

FREDERICK R. SUTTON AND WILLIAM O. SUTTON, OF WELLINGTON, ILL.

IMPROVEMENT IN HOOF-TRIMMERS.

Specification forming part of Letters Patent No. 150,800, dated May 12, 1874; application filed September 13, 1873.

*To all whom it may concern:*

Be it known that we, FREDERICK R. SUTTON and WILLIAM O. SUTTON, of Wellington, in the county of Iroquois and State of Illinois, have invented a new and Improved Horse-Hoof Trimmer, of which the following is a specification:

Our invention consists of a pair of side bars, pivoted to a toe-piece, and connected, at the heel, by a right-and-left screw, constituting a frame, to be clamped upon the hoof by screwing the side pieces against it, on which said frame is a cutter fixed in slots in the aforesaid side pieces, and provided with a cranked screw for forcing it up to the toe-piece, to shave off the bottom of the hoof. At the toe is a gage, to regulate the amount to be shaved off, and on one of the side clamping-pieces is a contrivance for quickly releasing the clamping-frame from the hoof in case the horse becomes restive.

Figure 1 is a side elevation of our improved hoof-trimmer. Fig. 2 is a plan of the under side, and Fig. 3 is a section of Fig. 2 in the line $x\ x$.

Similar letters of reference indicate corresponding parts.

A and B represent the two clamping-pieces. They are pivoted at one end to the strong toe-piece D at C, and at the other end they are connected to the right-and-left-hand screw E, which is swiveled in the nut F, so as to work them toward and from each other, according to the direction in which the screw is turned. Said side pieces are slotted, as at G, and a cutting-blade, H, is fitted in the slots, to slide toward and from the curved plate I, rising up from the toe-piece D, so as to bear against the toe of the hoof, as indicated in Fig. 3, in which the dotted lines J indicate the hoof to be trimmed. K is a screw fitted in the toe-piece, the nut M on the blade, and in the nut F, and provided with a hand-crank, L, for forcing the blade when trimming off the hoof. This screw is, by preference, provided with three threads for obtaining a quick motion; but it may have less if it is not important to move it so quick. N is a gage, suspended from the stud O of the toe-piece by the screws P Q and the thumb-bit R, so as to project under the toe of the hoof, and be shifted up and down, as shown in Fig. 2, to regulate the projection of the hoof below the blade at the front, and thus regulate the amount cut off.

The edges of the pieces A B, which clamp against the sides of the hoof, are serrated, to indent the hoof, and prevent slipping off from it. On the clamping-piece B is a thin plate, S, pivoted at T, and jointed at U with a lever-plate, V, which is pivoted to the piece B at W, and at T has a curved slot, X, through which the pivot-bolt T passes, so as to allow the plate to swing on its pivot W, and swing the plate S, which has a serrated edge, against the hoof or away from it. Said lever-plate has a handle-piece, Y, by which to push it forward and backward, and it is to be held by the screw T with considerable friction, to be kept in any position to which it may be adjusted. This plate is pushed inward, as represented in Fig. 2, when the machine is clamped onto a horse's foot, so that the plate S bears on the hoof, instead of the piece B, the edge being pushed beyond the said piece B, and it is held by the lever-plate and the screw T, so that the pressure of the screw E does not force it back, but not so strong but the operator can readily pull it back by the lever-plate to release the hoof quickly in case the horse becomes unmanageable.

We propose to joint the pieces A B to the toe-pieces D by rule-joints, using shouldered bolts, on which the nuts will screw up tight without pinching the joints together.

Having thus described our invention, we claim as new and desire to secure by Letters Patent—

1. The combination of the toe-piece D, side pieces A and B, and the right-and-left adjusting-screw E, substantially as specified.

2. The combination of the trimming-blade H and the cranked screw K L with the clamping-frame, consisting of the toe-piece, side pieces, and the adjusting-screw, substantially as specified.

3. The combination of the adjustable gage N with the toe-piece and the trimming-blade, substantially as specified.

4. The combination of the plate S and lever-plate V with the side pieces A B, toe-piece D, and the adjusting-screw E, substantially as specified.

5. The combination of the plate I with the toe-piece, substantially as specified.

FREDERICK R. SUTTON.
WILLIAM O. SUTTON.

Witnesses:
GEORGE W. GOOD,
CHARLES L. HARRIS.